(12) United States Patent
Wuppermann et al.

(10) Patent No.: US 6,725,197 B1
(45) Date of Patent: Apr. 20, 2004

(54) METHOD OF AUTOMATIC RECOGNITION OF A SPELLED SPEECH UTTERANCE

(75) Inventors: Friedhelm Wuppermann, Bocholtz (NL); Volker Stahl, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/415,832

(22) Filed: Oct. 12, 1999

(30) Foreign Application Priority Data

Oct. 14, 1998 (DE) ........................................ 198 47 419

(51) Int. Cl.[7] .............................................. G10L 15/04
(52) U.S. Cl. ........................ 704/251; 704/252; 704/254
(58) Field of Search ................................ 704/251–255, 704/257

(56) References Cited

U.S. PATENT DOCUMENTS

| | | | |
|---|---|---|---|
| 5,903,864 A | * | 5/1999 | Gadbois et al. ............. 704/251 |
| 5,995,928 A | * | 11/1999 | Nguyen et al. ............. 704/251 |
| 6,163,768 A | * | 12/2000 | Sherwood et al. .......... 704/235 |

OTHER PUBLICATIONS

"A Continuous Speech Recognition System Using Finite State Network and Viterbi Beam Search for the Automatic Interpretation", by Nam Yong Han et al, ICASSP 1995, pp. 117–120.

* cited by examiner

*Primary Examiner*—Talivaldis Ivars Šmits
*Assistant Examiner*—Abul K. Azad

(57) ABSTRACT

The invention relates to a method of automatic recognition of an at least partly spelled speech utterance, with a speech recognition unit (2) based on statistical models that include a linguistic speech model (6).

To improve this method in such a way that in addition to a convenient entry, also a reduced speech recognition error rate is achieved, there is proposed that after the at least partly spelled speech utterance has been entered, the speech recognition unit (2) determines a first recognition result for the whole speech utterance;

individually recognized letters are sent to the user for him to acknowledge or reject;

after a letter has been acknowledged, the linguistic speech model (6) is adapted, which linguistic speech model, after its adaptation, determines the number of letters that can be allowed as followers of the acknowledged letters and assumes the correctness of letters already acknowledged;

the speech recognition unit (2) determines a further recognition result for the speech utterance by means of the adapted linguistic speech model (6), from which result the next letter to be sent to the user is determined, so that he can acknowledge it.

8 Claims, 1 Drawing Sheet

METHOD OF AUTOMATIC RECOGNITION OF A SPELLED SPEECH UTTERANCE

FIELD OF THE INVENTION

The invention relates to a method of automatic recognition of an at least partly spelled speech utterance, with a speech recognition unit based on statistical models including a linguistic speech model.

The automatic recognition of spelled speech utterances nowadays still has high error rates. On the one hand, the problem is to detect the boundaries between the individual letters, because a user, when spelling, regularly pronounces the individual letters without pauses i.e. silences between the letters. Furthermore, it is hard to acoustically model the letters representing brief speech units and being without context.

In the field of navigation systems for motor vehicles it is known that an entry mode is rendered available to a user in which navigation data—for example, place names—are entered by spelling out (cf. the Carin navigation system).

With the entry of a place name in such a navigation system, to be briefly explained in the following, and after the entry mode for entering place names has been activated, the letters of the respective alphabet that can be entered are shown to the user on a picture screen. By turning a multifunction button, the user can switch to and fro between the individual letters. The selection and thus entry of a letter is effected by pressing the multifunction button. Before the first letter of the respective place name is entered the user is offered all the letters of the respective alphabet to select from. After the user has selected a first letter, the navigation system performs a comparison with a database stored on a compact disc (CD). The result provides information about which letters in the place names that can be processed by the system can follow each other. Thus, after the user has entered a first letter, the comparison with the database will lead to the fact that no longer the total alphabet is selectable for entering the next letter, but only a part of the alphabet. Accordingly, as a second letter there can only be selected by means of the multifunction button a letter belonging to this part of the alphabet. With each entry of a letter, the part of the alphabet that can be selected is reduced in most cases; in exceptional cases such a part may also remain unchanged after a letter has been entered. For the case where a certain entered letter sequence can only be followed by a certain letter or a certain letter sequence, the entry of these letters is no longer necessary for the user, because the navigation system automatically assumes this (these) letter(s) as if it was (they were) entered by the user. The entry mode leads to a faster entry of spelled place names, which is also more comfortable to the user.

SUMMARY OF THE INVENTION

It is an object of the invention to improve the method defined in the opening paragraph for automatic recognition of a spelled speech utterance so that, in addition to a more convenient entry, also a reduced speech recognition error rate is achieved.

The object is achieved in that after the at least partly spelled speech utterance has been entered, the speech recognition unit (2) determines a first recognition result for the speech utterance;

individually recognized letters are sent to the user for him to acknowledge or reject;

after a letter has been acknowledged, the linguistic speech model (6) is adapted, which linguistic speech model, after its adaptation, determines the number of letters that can be allowed as followers of the acknowledged letter and assumes the correctness of letters already acknowledged;

with the adapted linguistic speech model the speech recognition unit determines a further recognition result for the speech utterance, from which result the next letter to be sent to the user is determined, so that he can acknowledge it.

By means of the processing steps, in which the user is requested to acknowledge or reject recognized letters, the system receives a feedback relating to the correctness of the recognition result achieved thus far relative to the speech utterance to be recognized. The speech utterance to be recognized may be a single word or a word sequence, while the entry processed according to the invented method is the whole speech utterance spelled out or partly spelled out. The successive feedback is used for the step-by-step improvement of the statistic modeling used in the speech recognizer by a reduction of the search space. This leads to the fact that with each improvement the probability diminishes that a wrong letter is sent to the user to be acknowledged, which in its turn reduces the required time until the final recognition of the spelled speech utterance. The method thus enhances the convenience to the user. The acoustic models used in the speech recognition unit, which models were estimated on the basis of the spelled part of the speech utterance, need not be adapted according to the invented recognition procedure. Only the linguistic model used each time depends on the just processed position in the speech utterance.

For reducing the search space during the speech recognition, linguistic speech models are normally used. On the one hand, this reduces the computational expenditure for controlling the speech recognition unit and, on the other hand, this also brings in an improvement of the recognition results. However, there is the problem that a long linguistic speech model leads to too large acoustic search spaces. The processing of such a speech model requires very much memory capacity and cannot at present be realized or is inefficient with customary signal processors used for speech recognition applications. Thanks to the invention, the complexity of the linguistic speech model, on the other hand, is minimized. The speech model is successively adapted in dependence on the user's acknowledgements of letters. Already acknowledged letter sequences are then presupposed as fixed. Only for the letters acknowledged last is there determined with the aid of the linguistic speech model which letters are selectable as following letters. Such a speech model is highly uncomplicated and can easily be converted into the speech recognition procedures used by means of customary signal processors with little calculation effort and memory capacity.

For the case where the user rejects a recognized letter, preferably two alternatives for a further processing are considered. On the one hand, the speech recognition unit can perform a renewed recognition operation with respect to the whole speech utterance after the linguistic speech model has been adapted including this information. The probability that the user is given the correct letter as a next proposed letter is increased considerably. On the other hand, there is also the possibility that the speech recognition unit determines a list N of best recognition alternatives as a recognition result for the speech utterance and that, after the user has rejected a recognized letter, the user is given the respective letter of the second-best solution alternative. This has the advantage that, after the user has rejected a letter sent to him as a recognition proposal, the speech recognition unit need not again perform the speech recognition procedures with respect to the (complete) spelled speech utterance, which achieves that after a rejection of a produced letter the user is given a further letter alternative with a minimum time delay.

If individual position-specific probability values particularly depending on all the previous letters are assigned to separate letters, which fact can be converted as a specification of the linguistic speech model used, the probability is enhanced that already a first proposal for a letter standing at a specific position of the speech utterance is correct and is acknowledged by the user. Here is used to advantage that certain letter combinations occur more often than other letter combinations.

In another embodiment of the invention the degree of exchangeability with other letters expressed by the probability value is taken into account when an alternative to a letter rejected by the user is to be determined. Certain letters, such as, for example, "d" and "t" are acoustically more similar than other letters. This may be converted as information in the linguistic speech model so that, in case the user rejects such a letter, a higher probability than the probability of other letters is assumed, so that a letter defined as acoustically similar to this letter is the correct one and it has actually been entered as part of the spelled speech utterance.

As a further embodiment there is proposed that invalid and wrongly recognized initial letter combinations in the linguistic speech model are defined as invalid and are not proposed to the user and that in such a case the speech recognition unit determines a further recognition result for the speech utterance by means of the adapted linguistic speech model, from which result is determined the letter to be supplied to the user for him to acknowledge. To keep the speech model small, invalid initial letter combinations as such are not included in the speech model until the speech recognizer has falsely hypothesized them. If there is assumed that the entered speech utterance contains only words from a limited number of words, for example, when in a certain entry mode only place names are entered in a navigation system for motor vehicles, by means of this variant of the invention the basic linguistic speech model can accordingly be adapted, because the number of possible speech recognition results relating to the entered speech utterance may really be considered limited. This leads to a reduced search space of the speech recognizer and, finally, to an avoidance of proposed recognition results with initial letters or initial letter combinations which are a priori wrong and are to be disregarded.

The invention relates to an electrical appliance, more particularly a navigation system for motor vehicles, for implementing one of the methods described above. All the electrical appliances that have functional units which include a speech recognition unit are considered, in which also an entry by means of spelled speech utterances is possible.

These and other aspects of the invention are apparent from and will be elucidated with reference to the embodiment(s) described hereinafter.

DETAILED DESCRIPTION OF THE PREFERRED EMBODIMENTS

Figure 1:
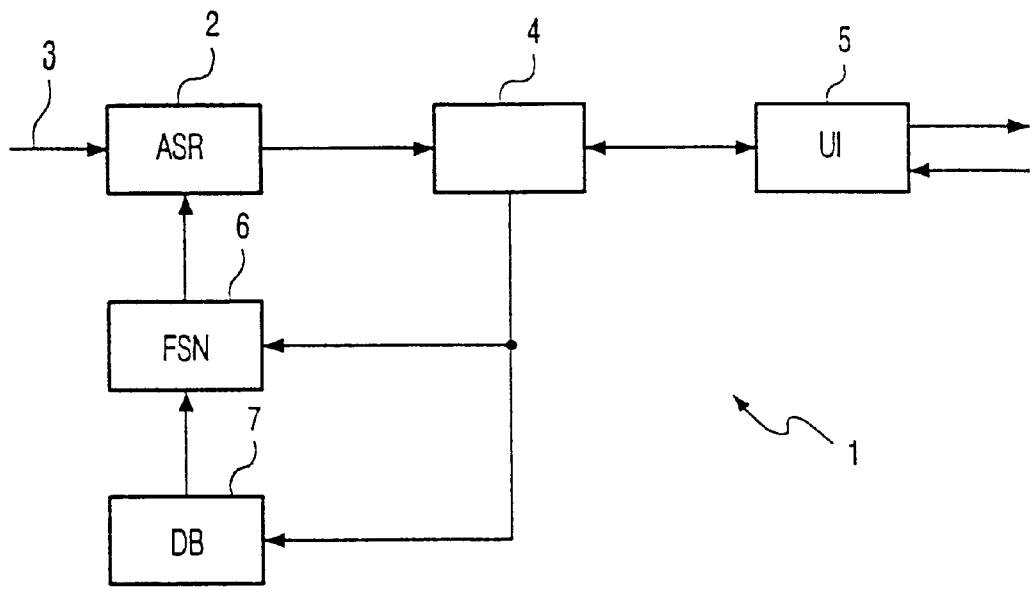
FIG. 1 shows the basic structure of an electrical appliance according to the invention represented in the form of functional blocks essential to the invention.

The electrical appliance 1 represented in FIG. 1, more particularly a navigation system for motor vehicles, is represented by means of functional blocks which represent the functions of appliance 1 that are essential to the invention. Other functions of the electrical appliance are disregarded for reasons of clarity. A functional block 2 represents a speech recognition unit (automatic speech recognizer ASR), which is supplied at its input 3 with a speech utterance available in the form of feature vectors.

In a navigation system for motor vehicles, a place name is entered as a destination for a ride, for example, in a specific entry mode. The acoustic signal corresponding to this speech utterance and captured by the microphone is converted into an electric signal in conventional manner, which electric signal is subsequently sampled and quantized. The digital signals thus obtained are subjected preferably to a Cepstral analysis for forming the feature vectors. The structure of feature vectors is not further shown in FIG. 1 as it is already known. The speech recognition unit 2 stores the feature vectors for the further processing and determines therefrom a recognition result for the entered total speech utterance. The speech recognition by the speech recognition unit 2 is based—as usual—on statistic speech modeling for which so-called hidden-Markov models (HMM) are used.

The first recognition result of the speech utterance generally still having recognition errors is not yet passed on to the user, but individual recognized letters are passed on to the user with the request to acknowledge or reject them. This will be further described in the following as a better illustration with the aid of a concrete entered speech utterance, the entry of the place name "AACHEN".

After a user has entered the name "AACHEN" and there is a first recognition result for the complete utterance, there is a procedure of which the co-ordination mechanisms are combined by a functional block 4. Individually recognized letters are then issued via an interface 5 (user interface UI) with a request to the user either to acknowledge the correctness of this letter or reject it. The response given to the user via the interface 5, which response can be given as an acoustic entry but also, for example, via control keys, is used for determining and adapting a linguistic model used by the speech recognition unit 2 (functional block 6). The linguistic model used here is a finite state network grammar FSN formed by nodes and edges, the way of operation of which will be explained hereinafter with reference to FIG. 2 and FIG. 3. The values of the parameters of the respective network grammar of the functional block 6 used by the speech recognition unit 2 are read from a database 7 DB stored on a CD, for example for navigation systems for motor vehicles, and are already available in marketed systems.

For example, there is assumed that the speech recognition unit 2 is in a mode for entering place names and has in the first step determined "AADAEM" as a recognition result for the speech utterance "AACHEN", with a network grammar being used during the speech recognition procedures, which grammar has no constraint with respect to the speech utterance letters to be recognized. The network grammar thus far comprises only two nodes K0 and K1, the edges between these two nodes containing all the initial letters of the places to be recognized. The edges between the two nodes K0 and K1 represent the permissible states with reference to the initial letter to be recognized. The edges going from K1 to K1 comprise all the letters of the alphabet.

With respect to the mode of operation of such a network grammar in the speech recognition unit 2, reference is made to the article by Nam Yong Han et al. "A CONTINUOUS SPEECH RECOGNITION SYSTEM USING FINITE STATE NETWORK AND VITERBI BEAM SEARCH FOR THE AUTOMATIC INTERPRETATION", ICASSP 1995, pp. 117 to 120, which provides further explanations. The function and the conversion of such a network grammar may therefore be supposed to be known here and will not be further explained.

Figure 2:
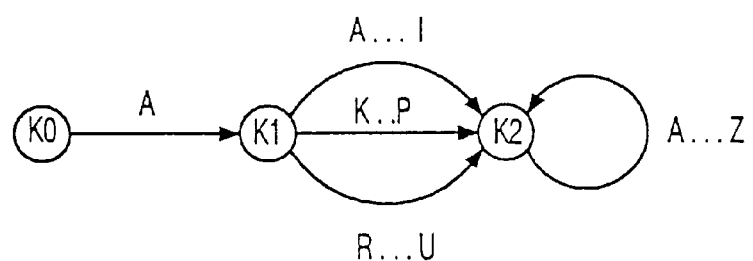
FIGS. 2 and 3 show two linguistic speech model used for speech recognition.

Via the interface 5 the user is now supplied with the letter "A" as a (correct) recognition result for the first letter of the speech utterance. After the user has acknowledged the correctness of this recognition result, this result is used for adapting the network grammar. This network grammar is extended to a network having three nodes K0, K1 and K2 with a single edge between the two nodes K0 and K1 which represents the state "letter A" for the first letter to be recognized (see FIG. 2). For the second letter to be recognized, a query of the database 7 provides as a possible recognition result one of the letters A to I or one of the letters K to P or one of the letters R to U. The respective adapted network grammar represented in FIG. 2 therefore has edges between the nodes K1 and K2 which respectively correspond to permissible states as already defined above (here for the second letter of the speech utterance). For clarity, not all the edges are represented individually. Therefore, FIG. 2 shows only a single edge for the letter group of the neighboring letters A . . . I. Similarly holds for the other two letter groups K . . . P and R . . . U. The letters J, Q and V . . . Z are stored as non-selectable second letters of the speech utterance to be recognized in accordance with the data stored in the database 7. These data are derived from the words defined as permissible place names. For the third letter and further letters the network grammar has no restrictions. All the letters or letter sequences are assumed to be possible in this operation step.

Figure 3:
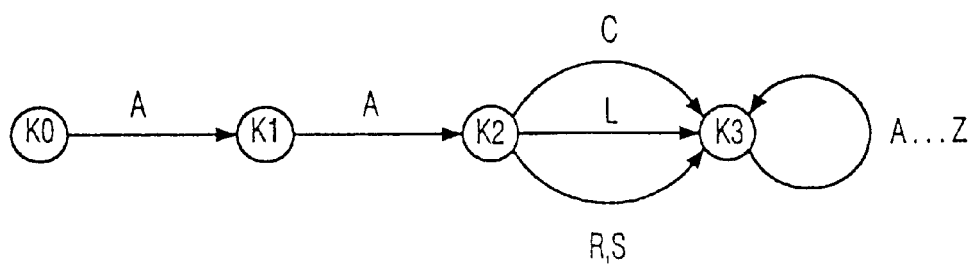

When the adapted network grammar in accordance with FIG. 2 is used as a linguistic speech model, the speech recognition unit 2 again carries out a speech recognition operation for the character vectors which are stored and derived from the originally entered spelled speech utterance "AACHEN", which in its turn leads to the recognition result "AADAEM". After "A" was proposed to the user for the second letter and this recognition result was also acknowledged as correct by the user, again an adaptation of the linguistic speech model used i.e. of the network grammar is made while the database information is used. After the adaptation, there is a network extension to four nodes K0, K1, K2 and K3, which is represented in FIG. 3. In accordance with the sequence "AA" as acknowledged initial letters, they are assumed to be known, so that both between the nodes K0 and K1 and between the node K1 and the node K2 only one edge is assumed to which is assigned a state corresponding to the letter "A". In accordance with the respective database information the number of permissible letters for the third letter of the place name to be recognized now contains only the letters "C", "L", "R" or "S". The FIG. 3 shows respective edges between the two nodes K2 and K3, while for clarity again only one edge is drawn for the two neighboring letters "R" and "S". This adapted network contains no (constraining) information about the fourth and possibly further letters of the speech utterance to be recognized.

With the re-modified linguistic speech model (=network grammar), a further speech recognition operation is carried out by means of the speech recognition unit 2, for which again the stored character vectors of the originally detected spelled speech utterance "AACHEN" are started from. This time, however, an improved recognition result "AACHEM" is produced on the basis of the modified linguistic speech model, which result only slightly differs from the actual speech utterance.

In accordance with the embodiments described above, there are further processing cycles until there is a recognition result with all the letters of the spelled speech utterance to be recognized, in which all the recognized letters are acknowledged as correct. This result is finally further processed by the electrical appliance 1 in the manner depending on the respective application. In the case of a navigation system for motor vehicles, for example, as a destination for a route plan.

For the case where a letter given to the user is rejected by him as being false, two possibilities of further processing are indicated—as explained below.

One possibility of further processing comprises modifying the linguistic model, so that the associated edge between two nodes is removed and, with the network grammar modified thus, a new recognition process is carried out by means of the speech recognition unit 2 for the stored speech utterance. It is assumed, for example, that after the speech recognition procedures have been carried out by the speech recognition unit 2, while the network grammar as shown in FIG. 2 is used, the letter determined second is not an "A" but a "K". After the user's rejection of this letter, because it is recognized as wrong, the edge assigned to the letter "K" between the nodes K1 and K2 would be removed and with this modified—but further unmodified—network grammar a new recognition procedure relating to the complete speech utterance (stored) would be carried out by the speech recognition unit 2. The probability that from now on the letter "A" would be recognized as correct as a second letter is then enhanced. This operation is repeated, as appropriate, until the second letter has been recognized as correct.

The other variant assumes a speech recognition unit 2, which produces N best solution alternatives as a recognition result after a recognition operation has been carried out, which is a known variant of a speech recognizer. If, for example, as assumed above, the second letter of the spelled speech utterance is not recognized as correct and rejected as false by the user, a recognition operation is not again carried out by means of the speech recognition unit 2. Instead, the functional block 4 includes a processing in which automatically the second-best solution variant of the list N of best solution alternatives is used for determining the second letter of the speech utterance. If even now the recognized second letter is still false and if it is rejected by the user, the second letter of the third-best solution variant of the list N of best solution variants is given to the user. This processing is continued until the user acknowledges a letter given to him as correct.

To expedite the process according to the invention, there may further be provided that individual probability values are assigned to selectable letters as a next letter to be acknowledged by the user. For example, in the network grammar according to FIG. 2, with respect to the edges between the two nodes K1 and K2, the edge having the letter "A" is assigned a first probability value, the edge having the letter "B" a second probability value and the other edges having the letters "C" to "I", "K" to "P" and "R" to "U" are assigned corresponding individual probability values. The magnitude of the individual probability values then depends on the statistical properties of the vocabulary used for the respective application of the electrical appliance 1.

Certain letters are acoustically more similar to other letters than the rest of the letters of the alphabet used. For example, the acoustic realization of the letter "D" is more similar to the acoustic realization of the letter "T" than the acoustic realizations of other letters. This is taken into account in a variant of embodiment of the invention. If a letter of the spelled utterance is not recognized as correct and the user rejects it as false, a renewed recognition operation by means of the speech recognition unit 2 will not be carried out. Instead, an acoustically similar letter is offered. The acoustic similarity between letters can, for example, be calculated statistically.

A further refinement of the linguistic speech model occurs when certain initial letters or initial letter combinations are classified a priori as invalid. For example, the letter sequence "XX" would be invalid for entering a place name, because there is no place name with such initial letters. If the recognizer recognizes such an initial letter sequence, the linguistic model will be modified, so that the recognizer will exclude this combination in the next recognition run. With the speech recognition by means of the speech recognition unit 2, the search space is then restricted accordingly and recognition results with initial letter sequences defined a priori as invalid will be avoided from the start.

In a further embodiment of the electrical appliance 1, individual letters or letter combinations which, in accordance with the information stored in the database, are to be considered a unique follower for a letter acknowledged by the user, are automatically defined as an acknowledged letter, without the acknowledgement procedure being carried out individually for these letters in such cases. This too leads to a faster recognition of the spelled speech utterance and increases the convenience to the user.

More particularly, it may also be sufficient when the user spells only part of the speech utterance to be recognized and enters it as a letter sequence to be modeled acoustically. Also in that case the electrical appliance 1 or method respectively, guarantees a satisfactorily fast recognition of the speech utterance.

What is claimed is:

1. A method of automatic recognition of an at least partly spelled speech utterance, with a speech recognition unit based on statistical models including a linguistic speech model, in which after the at least partly spelled speech utterance has been entered, the speech recognition unit determines a first recognition result for the speech utterance;

individually recognized letters are sent to a user with a request to acknowledge or reject;

after a letter has been acknowledged the linguistic speech model is adapted, which linguistic speech model determines the number of the letters that can be allowed as followers of the acknowledged letter and assumes the correctness of letters already acknowledged;

with the adapted linguistic speech model the recognition unit determines a further recognition result for the speech utterance from which result the next letter to be sent to the user is determined, so that the user can acknowledge it.

2. A method as claimed in claim 1, characterized in that, after a recognized letter has been rejected, the linguistic speech model is adapted in accordance with this information and the speech recognition unit carries out a new recognition operation.

3. A method as claimed in claim 1, characterized in that the speech recognition unit determines a list N of best recognition alternatives as a recognition result for the speech utterance and in that, after the user has rejected a recognized letter, the user is given the respective letter of the second-best solution alternative.

4. A method as claimed in claim 1, characterized in that separate letter are assigned individual probability vales which particularly depend on all the position-specific previous letters.

5. A method as claimed in claim 1, wherein the step of individually recognized letters further includes, when the user has rejected a letter, determining a recognition alternative to the letter and, the degree of exchangeability with other letters expressed in probability values is taken into account.

6. A method as claimed in claim 1, characterized in that invalid and wrongly recognized initial letter combinations in the linguistic speech model are defined as invalid and are not proposed to the user;

in such a case the speech recognition unit determines a further recognition result for the speech utterance by means of the adapted linguistic speech model from which result is determined the letter to be supplied to the user for him to acknowledge.

7. A method as claimed in claim 5, characterized in that letters for which there are no recognition alternatives are automatically processed as acknowledged letters, even without n acknowledgement by the user.

8. An electrical appliance comprising:

a processor with a speech recognition unit using linguistic speech model, wherein after an at least partly spelled speech utterance has been entered, the speech recognition unit determines a first recognition result for the speech utterance, and individually recognized letters are sent to a user with a request to acknowledge or reject;

after a letter has been acknowledged the linguistic speech model is adapted; with the adapted linguistic speech model the speech recognition unit determines a further recognition result for the speech utterance.

* * * * *